United States Patent [19]
Balde

[11] 3,873,648
[45] Mar. 25, 1975

[54] METHOD FOR SEPARATING MIXTURES OF ORTHOPHOSPHORIC ESTERS

[75] Inventor: Daniel Balde, Levallois-Perret, France

[73] Assignee: Produits Chimiques Ugine Kuhlmann, Paris, France

[22] Filed: July 7, 1972

[21] Appl. No.: 269,619

[52] U.S. Cl. .................... 260/990, 260/963
[51] Int. Cl. ............................. C07f 9/08
[58] Field of Search ...................... 260/990

[56] References Cited
UNITED STATES PATENTS
2,818,421  12/1957  Max .................... 260/990

OTHER PUBLICATIONS
Kosolapoff, "Organo Phosphoras Compounds," J. Wiley & Sons, Inc., New York, 1950, pp. 220–222.

*Primary Examiner*—Anton H. Sutto
*Attorney, Agent, or Firm*—Pennie & Edmond

[57] ABSTRACT

This invention relates to a method for separating mixtures of orthophosphoric monoesters and orthophosphoric diesters which comprises passing a mixture of orthophosphoric monoester and orthophosphoric diester in nonionizing solvent through an acid exchange resin possessing ions of the sulfonic type to preferentially retain the orthophosphoric monoester and thereafter washing the resin with an ionizing solvent to elute the orthophosphoric monoester and regenerate the resin.

8 Claims, No Drawings

METHOD FOR SEPARATING MIXTURES OF ORTHOPHOSPHORIC ESTERS

BACKGROUND OF THE INVENTION

1. Field of the Invention

This invention relates to the separation of phosphoric monoesters and diesters and more particularly, to the separation of mixtures of orthophosphoric acid esters obtained from the reaction of phosphoric anhydride or a polyphosphoric acid with an alcohol.

2. Description of the Prior Art

It is known to prepare the orthophosphoric diesters in a low cost manner by, for example, oxidizing the corresponding phosphorous diesters. However, this method cannot conveniently be used for preparing the orthophosphoric monoesters because the corresponding phosphorous monoesters are not easily prepared. No economically worthwhile method for synthesizing only the orthophosphoric monoesters is presently known. The latter are generally obtained in a mixture with the orthophosphoric diesters by reacting phosphoric anhydride or a polyphosphoric acid with alcohol. However, it is necessary that for certain applications, in particular, for use as solvents or surface active agents, the orthophosphoric monoesters be used alone. Up until now, the monoesters have been isolated from mixtures containing the same using laborious solvent extraction techniques or by precipitation from slightly soluble salts, these two methods generally being combined. The separation of mixtures of orthophosphoric monoesters and diesters by such methods becomes even more difficult with an increase in carbon chain length because the difference in physical characteristics of the monoesters and diesters upon which these methods are based becomes even less. Separation of the esters by these methods becomes practically impossible when there are more than eight carbon atoms in the chain.

SUMMARY OF THE INVENTION

It has been discovered in a most surprising manner that a mixture of orthophosphoric monoesters and orthophosphoric diesters can be conveniently separated by the method of this invention which broadly comprises passing a mixture of orthophosphoric monoester and orthophosphoric diester in nonionizing solvent through an acid exchange resin possessing ions of the sulfonic type to preferentially retain the orthophosphoric monoester and thereafter washing the resin with an ionizing solvent to elute the orthophosphoric monoester and regenerate the resin.

Under the conditions of the method of this invention, the orthophosphoric monoester becomes fixed on the resin while the diester is not retained. The monoester is recovered and the resin regenerated by washing the resin with an ionizing solvent.

It is entirely unexpected that a cationic sulfonic resin would retain the monoester which is acidic.

DESCRIPTION OF THE PREFERRED EMBODIMENTS

It is of no consequence how the mixtures of orthophosphoric monoester and diester are obtained. For example, the mixture can be obtained from the reaction of a phosphoric anhydride or a polyphosphoric acid with an alcohol which can have a long chain. However, for carbon chains of more than 18 carbon atoms, separation of the monoesters and diesters according to this invention is not economically practical since the solubility of the monoesters in the ionizing solvents generally employed because of their reasonable price decreases as the length of the carbon chain increases.

Any of the strong acid ion exchange resins of the sulfonic type can be employed in the method of this invention and advantageously, Amberlite 1R-120, Amberlite 1R-200 (Rohm & Haas Co.) and Dowex 50 (The Dow Chemical Co.) all of which are strong-acid resins derived from the sulfonation of styrene-divinylbenzene copolymers can be used. Dowex 50 describes a group of such resins possessing 2–16% crosslinking and from 20–400 mesh size. Amberline 1R-120 is a gel type resin possessing 8% crosslinking and from 16–50 mesh while Amberlite 1R-200 is a macroreticular resin possessing 20% crosslinking and from 16–50 mesh size.

With regard to the nonionizing solvent which can be used herein, it is of little consequence what solvent is selected but it is advantageous to employ a solvent which is sufficiently volatile to provide convenient separation and recovery of ester dissolved therein. Examples of nonionizing solvents which can be used herein include hexane, heptane, benzene and toluene. Many other nonionizing solvents can be used in addition to those specifically recited as is readily recognized by one skilled in the art.

Although the concentration of orthophosphoric monoester and diester in the nonionizing solvent is not a critical parameter of the method of this invention, it has been found advantageous to employ a concentration of esters between about 10 and 500% by weight of solvent since it has been found uneconomical to use concentrations of less than about 10% and concentrations in excess of about 500% result in excessively viscous solutions.

It is of little importance what ionizing solvent is selected for use in the method of this invention, but it is advantageous to choose the ionizing solvent bearing in mind the same considerations described above regarding the selection of the nonionizing solvent. Examples of ionizing solvents which are useful herein include water and alcohols.

For reasons of disposability and miscibility of nonionizing solvent with ionizing solvent, it is advantageous to utilize a pair of solvents such as toluene and ethyl alcohol.

The respective volumes of nonionizing and ionizing solvents utilized in the method of this invention can be readily determined by one skilled in the art for each particular case by plotting the separation curve for the monoester and the diester for the ion exchange resin employed (the volume of effluent being the abscissa and the concentration of ester being the ordinate). It is also within the skill of the artisan to readily determine for a particular case the duration of the passage of each solvent through the resin.

The monoester and the diester separated one from the other can each be separated from their solvents by distillation. It is advantageous to recycle the solutions at least once before distillation is carried out in order to increase the ester concentration and thus reduce the duration and cost of distillation. Recycling can also result in relatively improved purity of one ester compared to the other. In this regard, it has been observed that the purity of the monoester after a first passage of ionizing solvent is generally sufficient, however, it is often necessary to recycle the diester in order to improve its purity. The eluate containing the monoester which is often very diluted can be recycled in order to increase the concentration of monoester. It can be used, for example, to elute the monoester from the next run. In any event, it is necessary in each case to plot the separation curve for monoester and diester upon the resin employed in order to clearly determine what fractions are to be recycled. It has been observed that as the number of carbon atoms in the chain is increased, the more the eluate containing the monoester is free from the diester and the more its yield decreases as well as the relative purity of the diester.

Separation can be carried out at ambient temperature, however, in those cases when the solutions to be treated are very viscous, it is useful to operate at a somewhat higher temperature.

Separation can be carried out in a column of the sort hereinafter described. The separation can also be done batch-wise as follows: the appropriate volume of resin is suspended in the nonionizing solvent containing the mixture of esters to be separated for a fairly long period, for example, several hours, and thereafter the resin is filtered and regenerated by being suspended in the ionizing solvent.

A single batch operation obviously results in relatively low purities of monoester and diester as compared to a separation carried out in a column which in effect is equal to a very large number of batch operations. The effectiveness of a batch operation is equal to the results of a single plate in the column.

The direction of circulation in the resin for a given solvent will be determined as a function of the variation in volume of the resin during passage of the solvent. If the resin decreases in volume, it is advantageous to make the solvent flow in the descending direction and conversely, if the resin increases in volume, it is advantageous to make the solvent flow in the ascending direction in order to avoid packing of the resin with wear and splitting of the resin grains as well as splitting of the column. It has generally been observed that the volume of the resin decreases during absorption, that is, during passage of the nonionizing solvent and that the volume of resin increases during elution, that is, during passage of the ionizing solvent. Accordingly, it is advantageous to make the nonionizing solvent flow in the descending direction and the ionizing solvent flow in the ascending direction. It is further advantageous to pass a mixture of nonionizing/ionizing solvent through the resin after passage of the nonionizing solvent in order to reduce the effects due to the variation in volume of resin.

The following examples are illustrative of the method of this invention.

EXAMPLE I 150 ml. of a solution containing 150 gm. of a mixture of butylphosphoric monoester (40%) and diester (60%) in toluene was passed through a column 30 cm. in height and 3 cm. in diameter containing 600 ml. of Amberlite IR-120 in toluene over a period of an hour and a half. Thereafter the resin was washed with 650 ml. toluene over seven hours and then with 800 ml. of ethyl alcohol over three hours.

The first 200 ml. of eluate were discarded as they only contained liquid initially present in the resin and practically no diester. The fraction from 200 to 600 ml. contained 87% of the diester and its relative purity (% weight of diester based on total diester + monoester) was about 95% and the fraction between 600 and 1000 ml. contained 10% diester of a relative purity of about 94%.

The fraction between 100 and 1,350 ml. contained 90% of the monoester and its relative purity (% weight of monoester based on total monoester + remaining diester) was greater than 90%. The fraction between 1,350 and 1,600 ml. contained 8% monoester and its purity was about 100%.

EXAMPLE II 200 ml. of a solution containing 200 gm. of a mixture of monoester (40%) and diester (60%) in toluene was passed through the column described in EXAMPLE I over a period of two hours. Thereafter the resin was washed with 700 ml. of toluene over six hours followed by 250 ml. of an equal volume mixture of toluene and ethyl alcohol, and finally, by 500 ml. of a solution containing 12% ethanolic monoester from a previous run to elute the monoester. The operation was terminated by washing with 200 ml. of alcohol.

In this manner, 90% of butylic monoester having a relative purity in excess of 90% in a solution of about 20% concentration was recovered.

The solution of diester was obtained in the same manner as in EXAMPLE I.

EXAMPLE III 300 ml. of a solution containing 200 gm. of a mixture of equal parts by weight of monooctyl phosphate and dioctyl phosphate in toluene was passed through the column described in EXAMPLE I over a period of two and one-half hours. The resin was washed with 500 ml. of toluene over four hours followed by elution of the monoester with 1000 ml. of ethyl alcohol over two hours.

The diester fraction still contained 30% monoester and had to be recycled in order to complete separation. The monoester fraction between 1,150 and 1,800 ml. of eluate contained two-thirds of the monoester of about 100% purity.

EXAMPLE IV 320 ml. of a mixture of tridecylphosphoric monoester (44%) and tridecylphosphoric diester (56%) by weight in toluene was passed through the column described in EXAMPLE I over a period of five hours. The resin was washed with 880 ml. of toluene over seven hours followed by elution of the monoester by a countercurrent flow of 400 ml. ethyl alcohol over one hour.

The diester fraction still contained about 50% of the monoester and had to be treated a second time. The monoester fraction contained 50% of the monoester of about 100% purity.

EXAMPLE V

Using the column described in EXAMPLE I except that the resin was Dowex 50 × 8 (8% crosslinking; 50–100 mesh), 200 ml. of a solution containing 200 gm. of a weight mixture of butylphosphoric monoester (40%) and butylphosphoric diester (60%) were passed through the column over a period of one hour and a half. The resin was washed with 800 ml. of toluene in three hours followed by elution of the monoester by a countercurrent flow of 800 ml. of ethyl alcohol over two hours.

The toluene fraction contained nearly 95% of the diester of 95% relative purity and the alcohol fraction contained 95% of the monoester of 95% relative purity.

EXAMPLE VI

Using the column described in EXAMPLE I except that Amberlite IR-120 was employed, 300 ml. of a solution containing 200 gm. of the same mixture of butylphosphoric monoester and diester as in EXAMPLE I in 300 ml. of hexane was passed through the resin over three hours. The resin was washed with 800 ml. of hexane over seven hours followed by elution of the monoester with 600 ml. of ethyl alcohol flowing countercurrently for two hours.

The hexane fraction-contained 85% of the diester of a purity of about 90% and the alcohol fraction contained 80% of the monoester of 95% relative purity.

I claim:

1. A method for separating mixtures of saturated orthophosphoric monoesters having less than 14 carbon atoms and saturated orthophosphoric diesters having less than 14 carbon atoms, said mixtures containing from about 30% of the monoesters and about 70% of the diesters to about 70% of the monoesters and about 30% of the diesters, which comprises passing a mixture of orthophosphoric monoester and orthophosphoric diester in a nonionizing solvent through an acid exchange resin possessing ions of the sulfonic type to preferentially retain the orthophosphoric monoester and thereafter washing the resin with an ionizing solvent to elute the orthophosphoric monoester and regenerate the resin.

2. The method of claim 1 wherein the resin is a strong-acid resin derived from the sulfonation of styrene-divinylbenzene copolymer and possessing 2–16% crosslinking and from 20–400 mesh size.

3. The method of claim 1 wherein the resin is a strong-acid resin of the gel type derived from the sulfonation of styrene-divinylbenzene copolymer and possessing 8% crosslinking and from 16–50 mesh size.

4. The method of claim 1 wherein the resin is a strong-acid resin of the macroreticular type derived from the sulfonation of styrene-divinylbenzene copolymer and possessing 20% cross-linking and from 16–50 mesh size.

5. The method of claim 1 wherein the nonionizing solvent is a hydrocarbon selected from the group consisting of hexane, heptane, benzene, or toluene.

6. The method of claim 1 wherein the ionizing solvent is selected from the group consisting of water or ethyl alcohol.

7. The method of claim 1 wherein elution of the orthophosphoric monoester and washing of the ion exchange resin is carried out by countercurrent flow of solvent.

8. The method of claim 1 wherein the solvents obtained after passage of the ionizing and nonionizing solvents respectively are recycled at least once.

* * * * *